(12) United States Patent
Smelt

(10) Patent No.: US 11,241,001 B2
(45) Date of Patent: Feb. 8, 2022

(54) DEVICE AND METHOD FOR CHUMMING BAIT

(71) Applicant: Ronald F. Smelt, Orange, CA (US)

(72) Inventor: Ronald F. Smelt, Orange, CA (US)

(*) Notice: Subject to any disclaimer, the term of this patent is extended or adjusted under 35 U.S.C. 154(b) by 265 days.

(21) Appl. No.: 15/894,405

(22) Filed: Feb. 12, 2018

(65) Prior Publication Data

US 2018/0228138 A1 Aug. 16, 2018

Related U.S. Application Data

(60) Provisional application No. 62/457,964, filed on Feb. 12, 2017.

(51) Int. Cl.
*A01K 97/04* (2006.01)
*A22C 25/18* (2006.01)
*A22C 17/00* (2006.01)
*A01K 97/02* (2006.01)

(52) U.S. Cl.
CPC ............ *A01K 97/045* (2013.01); *A01K 97/02* (2013.01); *A22C 17/0026* (2013.01); *A22C 25/185* (2013.01)

(58) Field of Classification Search
CPC ........ A01K 97/02; A01K 97/04; A01K 97/05; A01K 97/045; A22C 17/0026; A22C 25/185; B02C 18/0092; B02C 18/067; B02C 23/00
USPC .............................................. 43/44.99, 42.06
See application file for complete search history.

(56) References Cited

U.S. PATENT DOCUMENTS

| | | | | |
|---|---|---|---|---|
| 2,769,268 A * | 11/1956 | Miller | ................... | A01K 85/01 43/42.06 |
| 3,249,257 A | 5/1966 | Nolt | | |
| 4,685,242 A * | 8/1987 | Stanish | ................. | A01K 97/02 43/42.06 |
| 5,097,620 A * | 3/1992 | Nietupski | ............. | A01K 85/01 43/42.06 |
| 5,720,124 A * | 2/1998 | Wentzell | ................ | A01K 97/02 43/44.99 |
| 6,442,887 B2 | 9/2002 | Sanquist | | |
| 6,530,171 B2 * | 3/2003 | Stevens | .................. | A01K 97/02 43/44.99 |
| 6,802,149 B1 | 10/2004 | Albanese, Jr. | | |

(Continued)

FOREIGN PATENT DOCUMENTS

AU 2016202820 A1 * 11/2017 ............. A01K 97/02
WO 2001008477 2/2001

*Primary Examiner* — Peter M Poon
*Assistant Examiner* — Jeffrey R Larsen
(74) *Attorney, Agent, or Firm* — Eandi Fitzpatrick LLP

(57) ABSTRACT

A device for macerating bait, making chum, or both is provided. The device has a main housing having a top openable end and a closed bottom openable end; a removable lid attachable to the top openable end, wherein the removable lid comprises at least a fluid flow hole configured to, when placed in a fluid and towed behind the vessel, port the fluid to flow through the housing through bottom openable end and through the top openable end; a push rod disposed through the removable lid; a concentric cutting member attached to the push rod at a lower end of the push rod, wherein the concentric cutting member comprises a series of blades that are intersecting and have cutting edges on a top and bottom of the blades.
A method of macerating bait is also provided.

7 Claims, 9 Drawing Sheets

(56) References Cited

U.S. PATENT DOCUMENTS

| | | | |
|---|---|---|---|
| 7,181,883 B1 | 2/2007 | Nassef | |
| 10,130,087 B1 * | 11/2018 | Alas, Jr. | A01K 97/02 |
| 2006/0005456 A1 | 1/2006 | Harris | |
| 2006/0174534 A1 | 8/2006 | Melhorn | |
| 2011/0062258 A1 * | 3/2011 | Coffield | B02C 18/0092 |
| | | | 241/25 |
| 2014/0259866 A1 * | 9/2014 | Jones | A01K 91/06 |
| | | | 43/42.06 |
| 2017/0223940 A1 * | 8/2017 | Bailey | A01K 97/02 |

* cited by examiner

DEVICE AND METHOD FOR CHUMMING BAIT

CROSS-REFERENCE TO RELATED APPLICATIONS

This application claims the benefit of U.S. Provisional Application No. 62/457,964 entitled Device and Method for Chumming Bait, filed on Feb. 12, 2017.

REFERENCE TO SEQUENCE LISTING, A TABLE, OR A COMPUTER LISTING APPENDIX

Not applicable.

FIELD OF THE INVENTION

The present invention relates generally to a device and method for chumming bait. More particularly, the invention relates to a device that uses motive force to macerate the bait within the device to create chum optimal size chum, the device also having a small footprint such that it is usable with vessels both small and large.

BACKGROUND OF THE INVENTION

Chumming is the practice of luring fish to an area where an angler is fishing by putting "chum" into the water, which is an oily and smelly slick created from a combination of fish parts, bone and blood. The practice of chumming is one that is used by fisherman worldwide, particularly while fishing in the ocean. However, while it is a practice common to fishing in saltwater, it also works just as well when fishing in freshwater. In addition to anglers, tour operators also utilize the chumming process in hopes of luring larger fish closer to their vessel to provide a better viewing experience for their customers.

Chumming can occur in many different forms. In the simplest of ways, chum is created by manually cutting fish bait up and throwing it over the vessel and into the water, allowing the slick from the chum to dissipate into the water from the fish bait directly where it is thrown. Other methods for chumming water includes using a device to assist in the chumming process, particularly the dispensing of the chum. For example, chum may be created by placing fish bait into a mesh bag, which is tied to the side of a vessel and suspended above the water, and then repeatedly hit with a solid object such as a wooden stick to create an oily and smelly chum slick that disperses from the bag and into the water. The boat may then drag the bag of chum along, chumming a whole specific area.

The process of using bags to disperse a chum slick is a popular method for chumming water, as it allows for maximum chum exposure to lure the fish to the vessel, while also preventing the chum from sinking or floating away (which is typical when the bait is simply cut and thrown into the water). However, these bags not only require the user to manually cut up the bait, which is labor intensive, time consuming, unsanitary, and many times unpleasing to the olfactory senses, but also create a splattered mess that only leaves bloody fish remains all over a user and/or their vessel. Furthermore, chum bags are oftentimes cut loose and left behind in the water when no longer needed, creating an unnecessary hazard to water creates and contributing to the environmentally unfriendly practice of polluting. This method of using bags to chum the water requires a significant time investment that could otherwise be used for fishing or entertaining clients onboard a sightseeing vessel.

With that being said, there have been past chumming devices that do obviate some of the aforementioned problems, but not to the point of utmost satisfaction. For example, U.S. Pat. No. 3,249,257 to Nolt describes a chumming device having a chute with walls forming an inlet and an outlet, one of said walls being movable, a reciprocating piston adjacent said outlet for pushing material transverse to said outlet, said reciprocating piston cooperating with an adjustable means on one of said walls thereby providing a shearing action between said piston and said adjustable means, and means on said piston for engaging said movable wall during reciprocation to oscillate said movable wall thereby agitating the material in said chute.

More "advanced" chumming devices, such as that described in U.S. Pat. No. 5,720,124 to Wentzell, describes a bait cutting and chumming device comprising: an elongated rigid tubular body defining an inner chamber, said tubular body having a longitudinal axis, a first open end and a second open end and a plurality of perforations therein, a rigid first plug removably inserted into said first open end and defining a first through bore disposed about said longitudinal axis, a rigid second plug removably inserted into said second open end and defining a second through bore disposed about said longitudinal axis; an elongated rigid shaft extending along said longitudinal axis within said inner chamber and passing through both said first through bore and said second through bore, and blade assembly affixed to said shaft within said chamber of said tubular body such that the blade chums bait while being pulled by a vessel.

The problem with these past devices is that they are large and cumbersome, and as such, are not convenient for smaller vessels. Also, they are prone to leakage and in some cases require a large amount of motive force to chum the bait to a desired size. Consequently, what is needed is a chumming device that is powerful yet economically sized, water-tight, easy to operate, and easy to clean.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
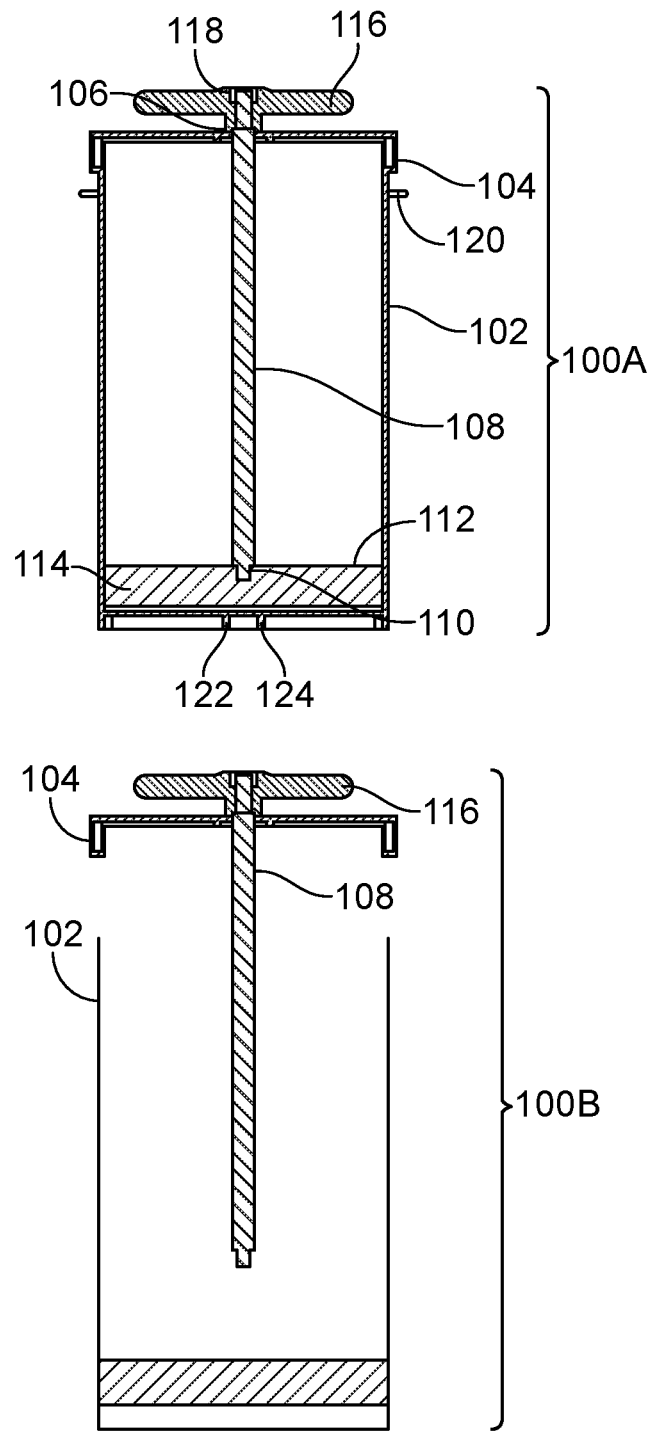
FIG. 1 is a plurality of side views of exterior of the chumming device in accordance with one embodiment of the present invention.

Unless otherwise indicated, illustrations in the figures are not necessarily drawn to scale.

SUMMARY OF THE INVENTION

To achieve the forgoing and other aspects and in accordance with the purpose of the invention, a chumming device is presented.

In one embodiment, a device for macerating bait, making chum, or both, is provided. The device has a main housing having a top openable end and a bottom end; a removable lid attachable to the top openable end, wherein the removable lid comprises at least an air flow hole configured to release air during use; a push rod disposed through the lid; a concentric cutting member attached to the push rod at a lower end of the push rod, wherein the concentric cutting member comprises a series of blades that are intersecting.

In another embodiment, a method for chumming is provided. The method comprises providing a main housing have a top openable end and a bottom openable end; a removable lid attachable to the top open end, wherein the removable lid comprises at least an air flow hole configured to port air out of the housing during use; filling the main housing with predetermined amount of bait; pushing a concentric cutting member via a push rod and handle in opposing directions, wherein the concentric cutting member comprises a series of blades that are intersecting; releasing the chum into a fluid.

Advantages of the present invention comprise the ability to create chum in a way that requires much less manual motive force than prior art devices. Also, importantly, the chumming device is fully contained and sealed to prevent and obviate spillage during chumming of the bait.

Another object of the present invention is to provide a new and improved chumming device that is environmentally sound and is most attractive to fish.

Another object of the present invention is to provide a new and improved chumming device capable of cutting whole bait and creating chum by manually operated reciprocating action and twisting motion.

Another object of the present invention is to provide a new and improved chumming device that is inexpensive to construct.

Still another object of the invention to provide a new and improved chumming device with means that allow the device to be attached to a vessel and dragged behind it in such a way as to promote viscosity of fluid through the device to disperse of the chum slick.

A further object of the present invention is to provide a new and improved chumming device that is stackable and has a small footprint.

Other features, advantages, and aspects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these Figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

Referring now to FIG. 1, a side view of the chumming device with the removable lid attached to the top end in accordance with one embodiment of the present invention, is presented generally at 100A. In this side view, the chumming device is transparent to show the elements inside the main housing 102.

Still referring to FIG. 1, the chumming device 100 comprises a main housing 102, which in this embodiment is an elongated rigid tubular body having an open end. In optional embodiments, the main housing 102 may be configured in other shapes and sizes. A lid 104 with a rigid grommet coupled to it is provided and is integrally formed with, but removable from, the main housing 102, such that the main housing 102 is configured to be coupled to the lid 104, receive the rigid grommet, and form a secure seal between the main housing 102 and the lid 104. This securing means allows the lid 104 to remain securely seated in the open end of the main housing 102 during chumming and, as will be appreciated more fully after discussion of the operation of the device below, capable of preventing any fluids or bait from escaping the main housing 102 but will allow air to escape through the air ports while in use; when the lid 104 is uncoupled from the main housing 102 the user can load bait into the main housing 102 via the open end and perform other maintenance activities that may be necessary such as removing old bait and clean the interior components. The use of the device with the lid 104 uncoupled is further discussed below is relation to 100B and the configuration of the grommet is further discussed below in relation to FIG. 3. Embodiments of the present invention include all types of lid closures known now or in the future (e.g., threaded fit, frictions fits, and the like).

Still referring to FIG. 1, the main housing 102 and lid 104 may comprise any rigid and water and corrosion resistant material. Preferably a plastic, such as polyvinylchloride (PVC) which is impact resistant and therefore capable of withstanding the stresses relating to operation of the handle and from being dragged while submerged in open waters behind a vessel. The use of PVC also allows for extrusion molding of the product, is chemically weldable, and is easy to cut, drill or otherwise manipulate during the manufacturing or assembly of the device. In optional embodiments, the diameter of the main housing may be increased or decreased to accommodate any volume of bait, scale of usage and to match preexisting PVC piping stock standard sides. In even optional embodiments, other less desirable plastics or other suitable materials such as metal, may be substituted.

Still referring to FIG. 1, the lid 104 further comprises an aperture or center hole 106 in the center dimensioned with an opening for insertion of a push rod 108. The aperture 106 also follows through the grommet coupled to the lid, such that the grommet is configured to receive the push rod 108 and in such a way that once inserted, the grommet acts as a guideway and support for the push rod 108, helping it remain centered in the main housing 102. In optional embodiments, a ferrule or other guide piece may also be disposed of in the aperture to serve as a guideway and support for the push rod 106. In operation, a spring or other resilient members may be employed to and engaged at one end of the rod to permit free reciprocating movement of the push rod. In addition, to being configured to permit the free passage of the push rod 108, the grommet will also be dimensioned appropriately to allow the push rod 108 to perform a twist or rotational motion as is further described herein.

Still referring to FIG. 1, the push rod 108 is rigid, preferably made of corrosion-resistant pipe stock, preferably aluminum pipe being of a sufficient thickness to provide rigidity and strength under normal operation, or hard plastics such as Acrylonitrile butadiene styrene (ABS) or Polyethylene terephthalate (PET). The push rod 108 passes through the main housing 102 and extends through an aperture 110 in the blade housing 112 to permit the push rod 108 to be coupled to the blade housing 112. When coupled to the blade housing, 112 the aperture is configured to permit a sliding, reciprocating motion of the push rod 108, together with a twisting or rotating motion. These reciprocating rotating actions ensure that the device operates at an optimal level to create chum while reducing user fatigue.

Figure 4:
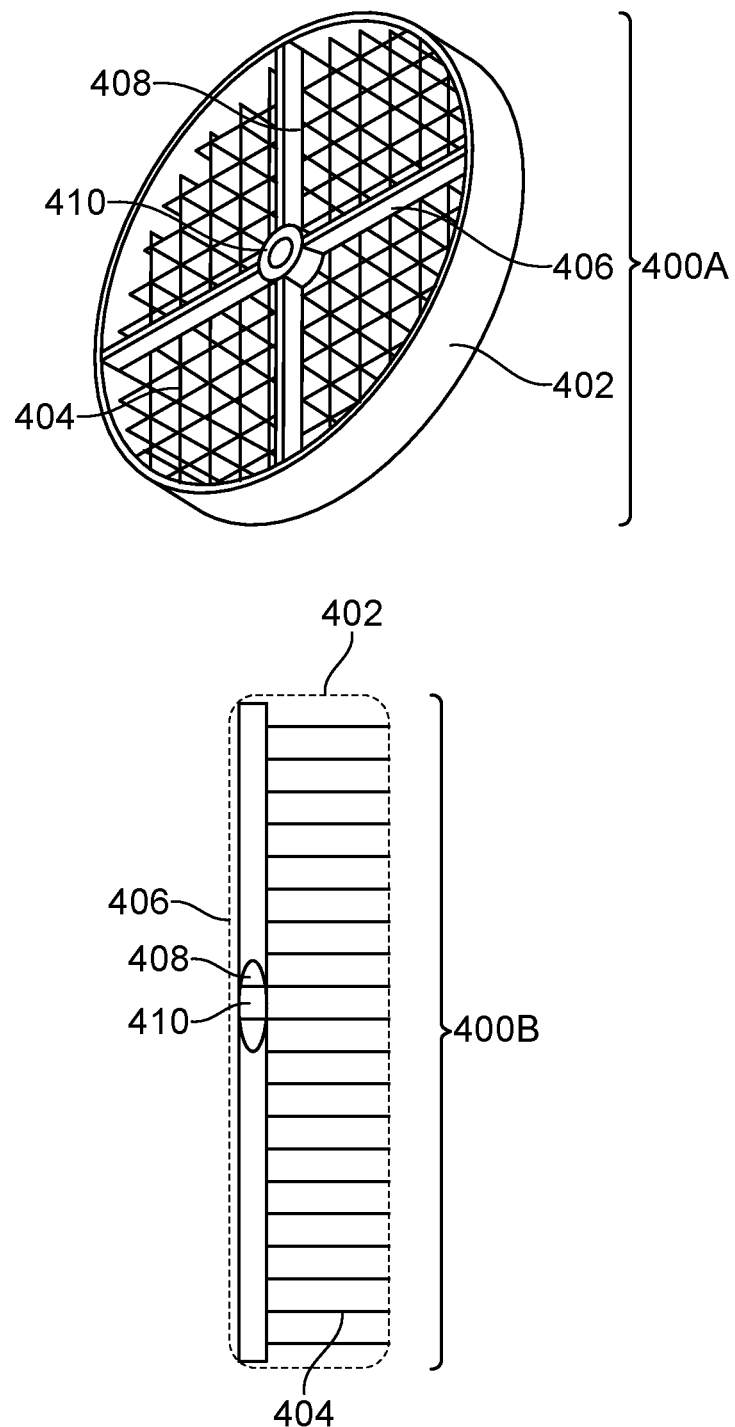
FIG. 4 is a plurality of views of the blade housing in accordance with one embodiment of the present invention.

Still referring to FIG. 1, the blade housing 112 is comprised of one or multiple blades 114 and, as will be more appreciated when discussed in greater detail with relation to FIG. 4, is configured to chop and macerate bait to the optimal consistency to create the most effective chum slick. The use of multiple blades allows for a finer chop of the chum. Furthermore, the blades have cutting edges on the top and bottom sides allowing for less strokes to macerate bait. The spacing between each blade fixture may depend upon the type of bait to be chummed (e.g., salt water application, fresh water application). However, in optional embodiments, a single blade may be used if the level of maceration desired would be better accomplished utilizing a single blade and not multiple blades. For example, a single blade would produce be used if a coarser chop was desired, which may be preferable in large sightseeing operations where excess chum in the water may render the appearance unappealing to guests. However, using the concentric blade, the user can more easily discern the desired chop based on amount of times pushed and pulled, and the amount of force used.

Still referring to FIG. 1, a handle 116 is coupled to the end of the push rod 108 through an aperture 118 located within the handle 116. The push rod 108 will be coupled to the handle 116 through the use of a nut. However, in optional embodiments, any appropriate connection means can be used such as screws, bolts, bearings and the like. The handle is configured to provide many usages. For example, as the push rod 108 is coupled to the lid 104, the handle 116 allows for the removal of the lid; 100B shows the lid 104 decoupled from the main housing 102, and attached to the lid 104 are the push rod 108 and handle 116. In addition, the handle 116 also acts as a comfortable gripping area to which a user can provide a motive force to in order to operate the push rod 108 and the blade housing 112. The motive force may comprise rotational force together with an adjacent "up and down" or "pull and push" force, and a rotations force as well. In addition, the handle 116 can be used to transport the device when the lid 104 is coupled to the main housing 102. In optional embodiments in which the housing is towed behind a vessel. As even another example, the handle 116 may act as foundations for attachment members to a vessel via rope or other means such as paracord or carabiners. In addition, a separate carry handle 120 is also coupled directly to the exterior of the main housing 102 to provide additional means to use, secure and transport the device.

In exemplary embodiments, the chumming device is used on board the vessel, and the user can scoop and throw loose chum into the water to create a chum slick near the vessel to lure in fish. However, in optional embodiments, the device may be towable behind the vessel. In these optional embodiments, still referring to FIG. 1, should the bottom of the housing be openable rather than a closed bottom, located along the bottom of the main housing 102 are two fluid flow ports 122 and 124. The fluid flow ports 122 and 124 may be are coupled to closeable and openable flaps 716 and 718 (shown in FIG. 7) that are configured to, as will be appreciated more fully after discussion of the operation of the device below, allow water to enter the main housing 102 and create the pressure operation necessary to cause the chum slick to exit the main housing 102 through the fluid holes located on the lid 104. In addition, two hooks 126-128 are also located on the bottom of the main housing 102 which allow the main housing 102 to be coupled to a vessel through the use of rope or cable or other strong material. Closed bottom 130 is also shown herein, which acts to stop the blades during maceration, while providing a surface to macerate the bait.

Figure 2:
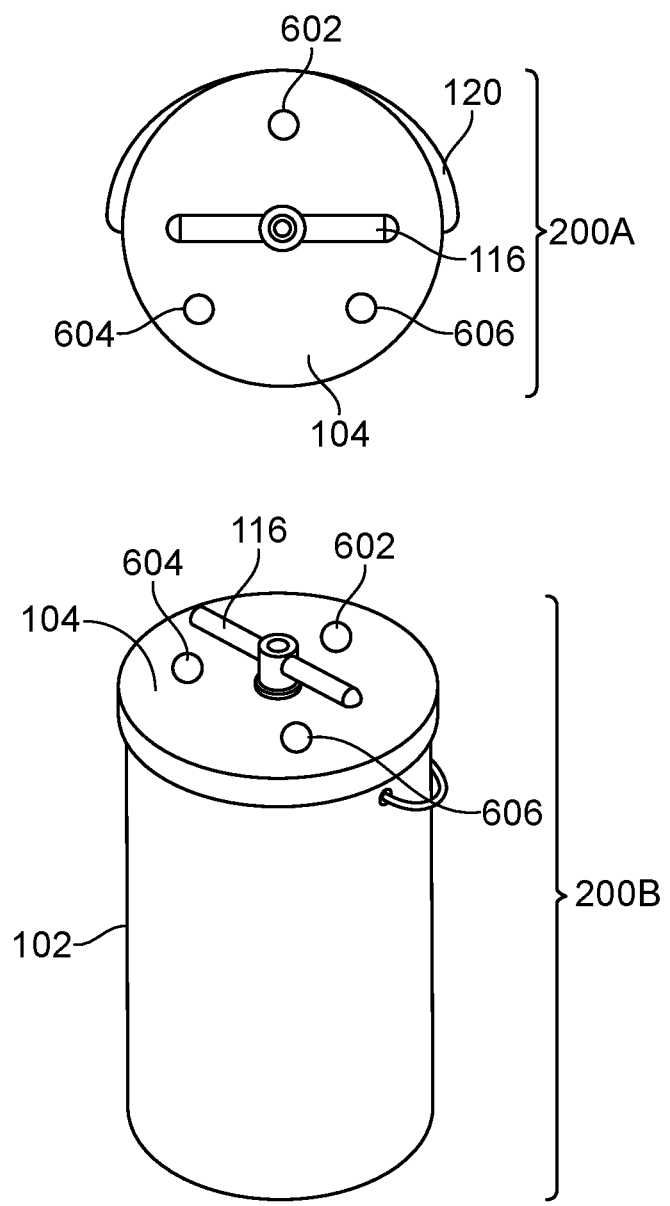
FIG. 2 is a plurality of top views of the exterior of the chumming device in accordance with one embodiment of the present invention.

Referring now to FIG. 2, a plurality of top views of the exterior of the chumming device in accordance with one embodiment of the present invention, are presented generally at 200. At 200A, a top view is shown in which the handle 116, lid 104 and carry handle 120 can be seen. At 200B a perspective top view is shown in which the exterior of the main housing 102 can also be seen, in addition to the handle 116, lid 104, carry handle 116 and the connector 202. The carry handle 120 is movably affixed to the exterior of the main housing 102 at two points such that when grasped the handle rotates freely along a fixed axis so that a user can comfortable carry or handle the device.

Figure 3:
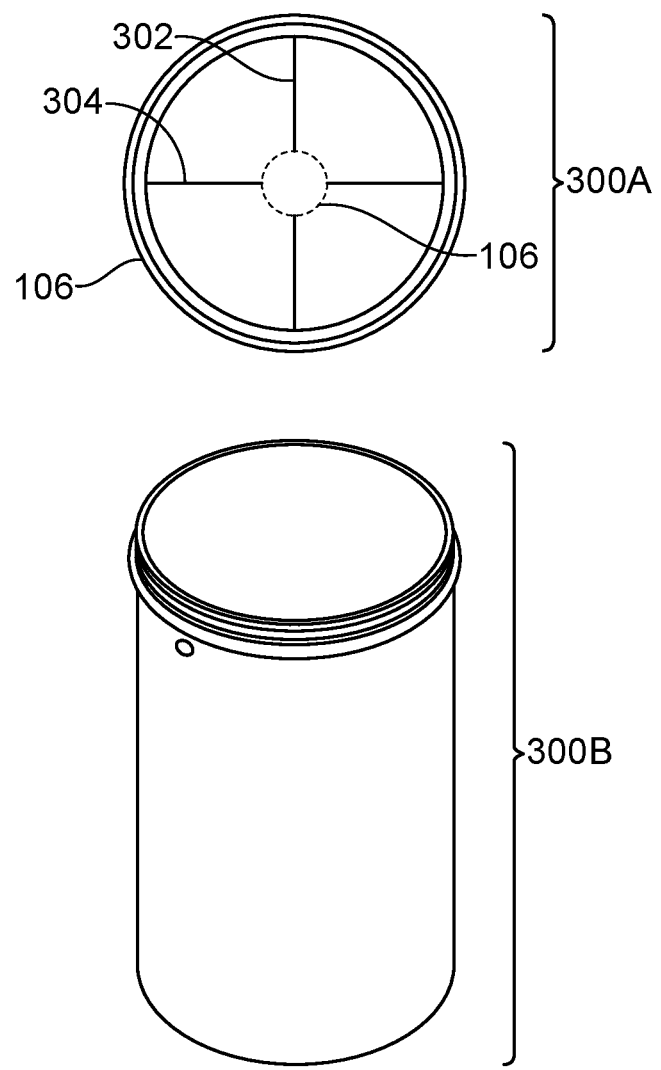
FIG. 3 is a plurality of views of the sealing gasket in accordance with one embodiment of the present invention.

Referring now to FIG. 3, a plurality of views of the sealing gasket in accordance with one embodiment of the present invention, is presented generally at 300. At 300A a view of the underside of the lid 104 is shown. The lid 104 comprises a plurality of support slats 302-304 configured to reinforce both the lid 104 and main housing 102 when coupled thereto, as well as a gasket 106 which creates the secure seal between the lid 104 and main housing 102 when coupled thereto. In the current embodiment, the gasket 106 is made from a rubber, but in optional embodiments, other materials may be used, such as polytetrafluoroethylene, silicone, neoprene, nitrile rubber or a plastic polymer. In even other optional embodiments. In even other embodiments, the lid 104 and main housing 102 may be coupled together via threads. However, in other embodiments, other attachments may be used. The aperture 106 for the push rod 108 is shown to give perspective and to provide an understanding of the alignment of the support slats 302-304.

Referring now to FIG. 4, a plurality of views of the blades in accordance with one embodiment of the present invention, are shown generally at 400. At 400A a top perspective view of the blade housing 112 is shown. The blade housing 112 may comprise an outer ring 402, which acts as a support structure to, and a means of attachment for, a plurality of individual blades 404. Each blade 404 is generally rectangular in shape to effectively increase the cutting edge surface area for each of operation of the device when the main housing 102 is loaded with bait. The cutting edge is on the top and the bottom the blades to macerate in both directions.

Still referring to FIG. 4, two support slats 406-408 are coupled to the interior of the blade housing 112 perpendicular to one another other so as to provide rigidity across the center lines. In the current embodiment, the blades 404 extend from the outer ring 402 and are configured to be arranged in a grid pattern with each blade 404 bearing a height of approximately one quarter of an inch. In optional embodiments, the blades 404 may be configured to be bigger or smaller dependent upon certain usage conditions, such as size of bait and scale of operation (e.g., small fisherman vs commercial fisherman). Again, both top and bottom cutting edges are provided herein.

Still referring to FIG. 4, the blade housing 112 may further comprise an aperture 410 at the intersection of the two individual support slats 406-408 that are configured to accept the push rod 108. When the push rod 108, which has the handle 116 coupled to it at the opposite end of the push rod 108, is coupled to the aperture 410, the user will be able to apply motive forces to the handle 116. The blade housing 112 is allowed to reciprocate within the full length of the interior of the main housing 102 whereby each pass of the blade housing 112, and thereby the blades 404 coupled thereto, across a bait fish contained within the main housing 102 causes the blade to mince the bait fish into chum slick. It should be noted that the blade housing 112 may be rotated as well as reciprocated by rotating the handle 116 coupled to the push rod 108 related to the main housing 102. Such action allows the blade position to be randomly altered to mince undisturbed areas of bait and aid the diffusion of chum by stirring the chum slick.

Still referring to FIG. 400, at 400B a side view of the blade housing 112 is shown. In this embodiment, the outer ring 402 is in dashed lines so show it as transparent to provide a better view of the internal elements. The two support slats 406-408 as well as the aperture 410 are shown at 400B. In addition, the spacing of the blades 404 is better illustrated to show the equidistant arrangement. In optional embodiments, the blades 404 may be arranged in another fashion, including both equidistant and non-equidistant arrangements.

Figure 5:
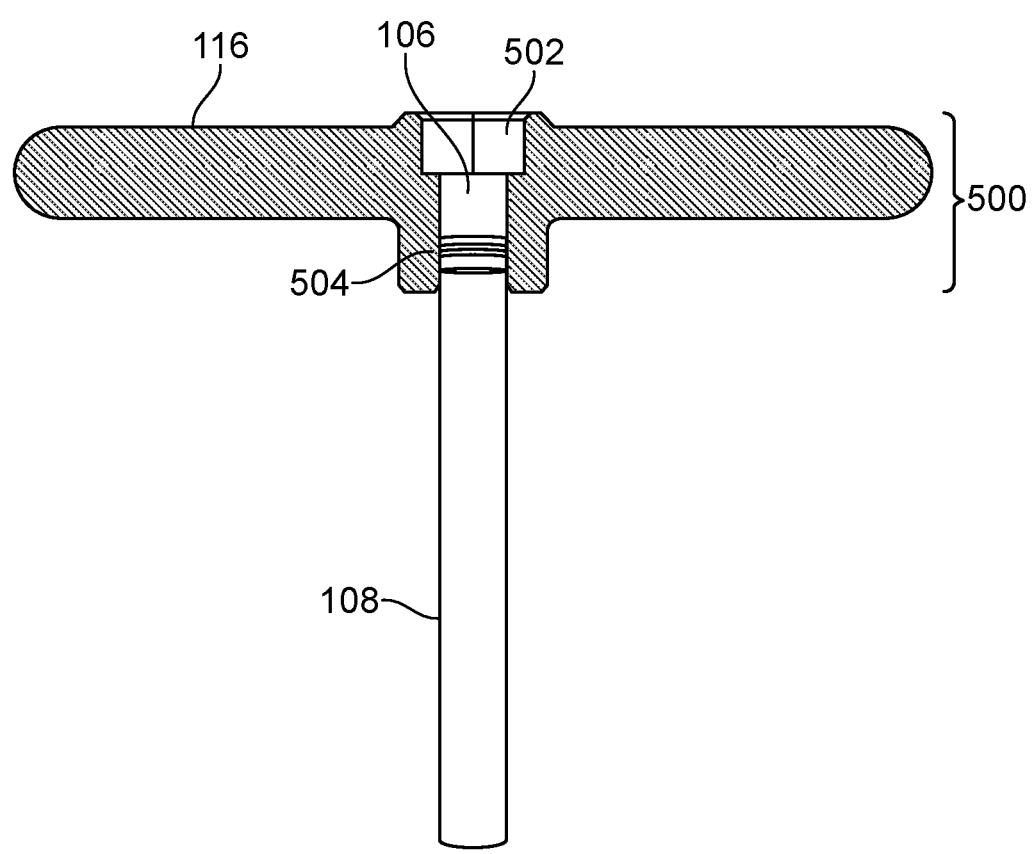
FIG. 5 is a side view of the handle in accordance with one embodiment of the present invention.

Referring now to FIG. 5, a side view of the handle in accordance with one embodiment of the present invention, is presented generally at 500. In this embodiment, the handle 116 is presented in dashed lines to show the internal components. At the center of the handle 116 is the aperture 106 where the push rod 108 is to be coupled to, which, in this current embodiment, is accomplished by screwing the threaded end 504 of the push rod 108 into a threaded nut 502 coupled to the interior base of the aperture 106. In optional embodiments, the push rod 108 may be coupled to the threaded nut 502 located within the base of the aperture 106 using alternative means such as welding.

Figure 6:
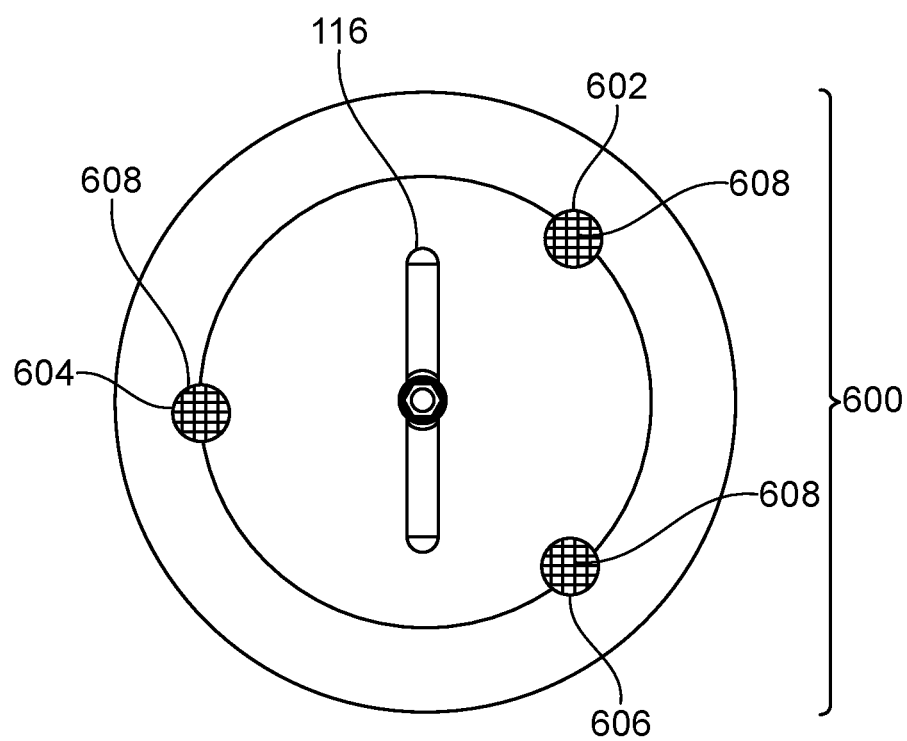
FIG. 6 is a top view of the lid in accordance with embodiment of the present invention.

Referring now to FIG. 6, a top view of the lid in accordance with one embodiment of the present invention, is presented generally at 600. The handle 116 is shown for purposes of orientation. Disposed the lid are three air flow holes 602, 604 and 606, which ensure that during use no vacuum is created in the housing. This allows the user to easily and with minimal effort push and pull the rod up and down (i.e., reciprocating motion) with relative ease. Once the user macerates the bait on board, they can open the lid and chum the water.

However, in optional embodiments, the device may be towable behind the vessel. In these optional embodiments, still referring to FIG. 1, and as will be appreciated in discussion with regards to FIG. 7, allow for the chum slick to disperse from the interior of the main housing 102 and out into the water. In the present embodiment, the air flow holes 602, 604, and 606 may act as fluid flow holes, and in embodiments, are covered with a mesh 608, 610 and 612 and, as will be more readily appreciated when discussed in regard to FIG. 7. If the device is used in this way, they are left in an open configuration such that the chum slick can freely flow through it. The mesh 608, 610 and 612 coupled to the fluid flow holes 602, 604 and 606 prevent large chucks of uncut bait or chum from escaping the main housing 102. In optional embodiments, the fluid flow holes 602, 604, and 606 may be coupled to closeable and openable flaps 720, 722, and 724 (shown in FIG. 7) that are configured to allow the chum slick to flow through the air or fluid flow holes 602, 604 and 608 when the flap is open and prevent the same from flowing through when the flap 720, 722 or 724 are closed.

Figure 7:
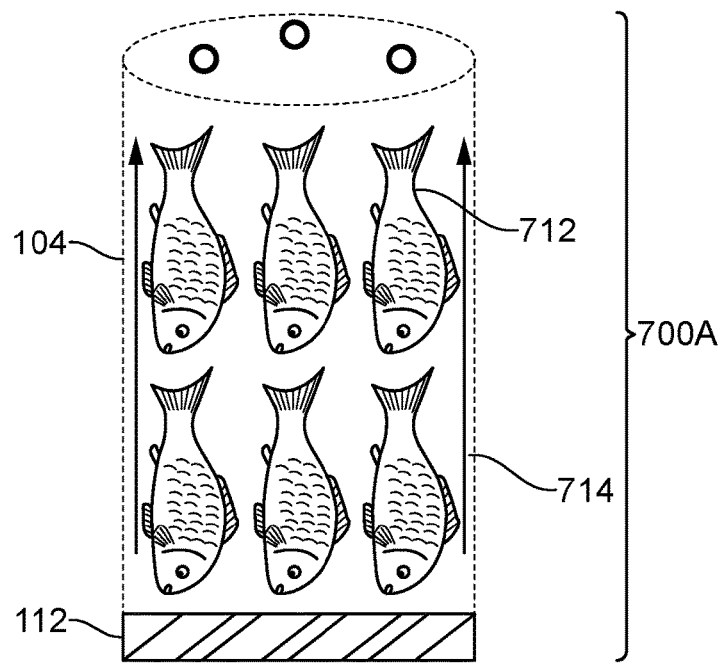
FIG. 7 is an side view of air flowing through the chumming device while in use in accordance with one embodiment of the present invention.
Figure 7:
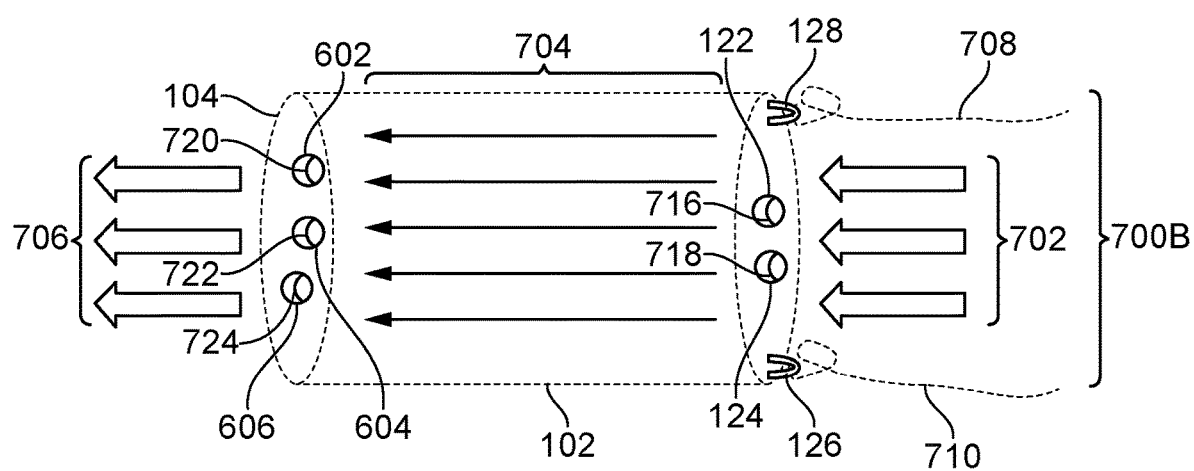

Referring now to FIG. 7, an environmental view showing air flowing through the chumming device while in use in accordance with one embodiment of the present invention, is presented generally at 700. The lid 104 is shown for purpose of orientation. In operation, the main housing 102 is filled with whole or partially chopped bait, such as fish or squid, by decoupling the lid 104 and inserting the whole bait into the interior of the main housing 102. To ensure the blades 404 operate at a maximum efficiency and are able to perform the cutting action to its maximum effect possible, whole bait should be used to properly fill the main housing 102. Once filled, the lid 104 may then be recoupled to the main housing 102 and the user may begin to turn and pull the handle 116, causing the push rod 108 and attached blade housing 112 to reciprocate and rotate within the main housing 102, causing the blade housing 112 to be passed over the whole bait and macerate it. As the user is macerating the bait and pushing down, air is released through the air holes to ensure ease of use, as shown at arrow 714, so as to avoid and unwanted vacuum. The user can then scoop out the chum and put it in the water to create a chum slick.

Optionally, in the case the device is towed behind the vessel, the user can remove the bottom portion and either leave the bottom open, or have a bottom attachment member having holes in it attached thereto. Once the bait is properly macerated, the main housing 102 is then hung overboard the vessel and towed behind it by attaching rope or cable 708-710 to the two hooks 126-128 located at the bottom of the main housing 102. When placed into the water, the design of the main housing 102 is such that the device is configured to float just below the surface of the water as the vessel propels forward through the water. As the main housing 102 is dragged behind the boat, the water flows in 702 through the air or fluid flow ports 122-124 coupled to the bottom of the main housing 102 and through the interior 704 of the main housing 102, with the pressure created therein forcing the chum slick upwards towards the fluid flow ports 602-606 on the lid 104, thereby causing the chum slick to be released as shown by arrows into the water and the chumming process to be completed. The embodiment included in FIG. 7 demonstrates the flow of water in 702, through 704 and out 706 of the main housing 102. In optional embodiments, a lower lid may be removed entirely leaving only the support slat to connect to the vessel. The motive force of the vessel ensures the chum remains in the housing to form the slick.

Figure 8:
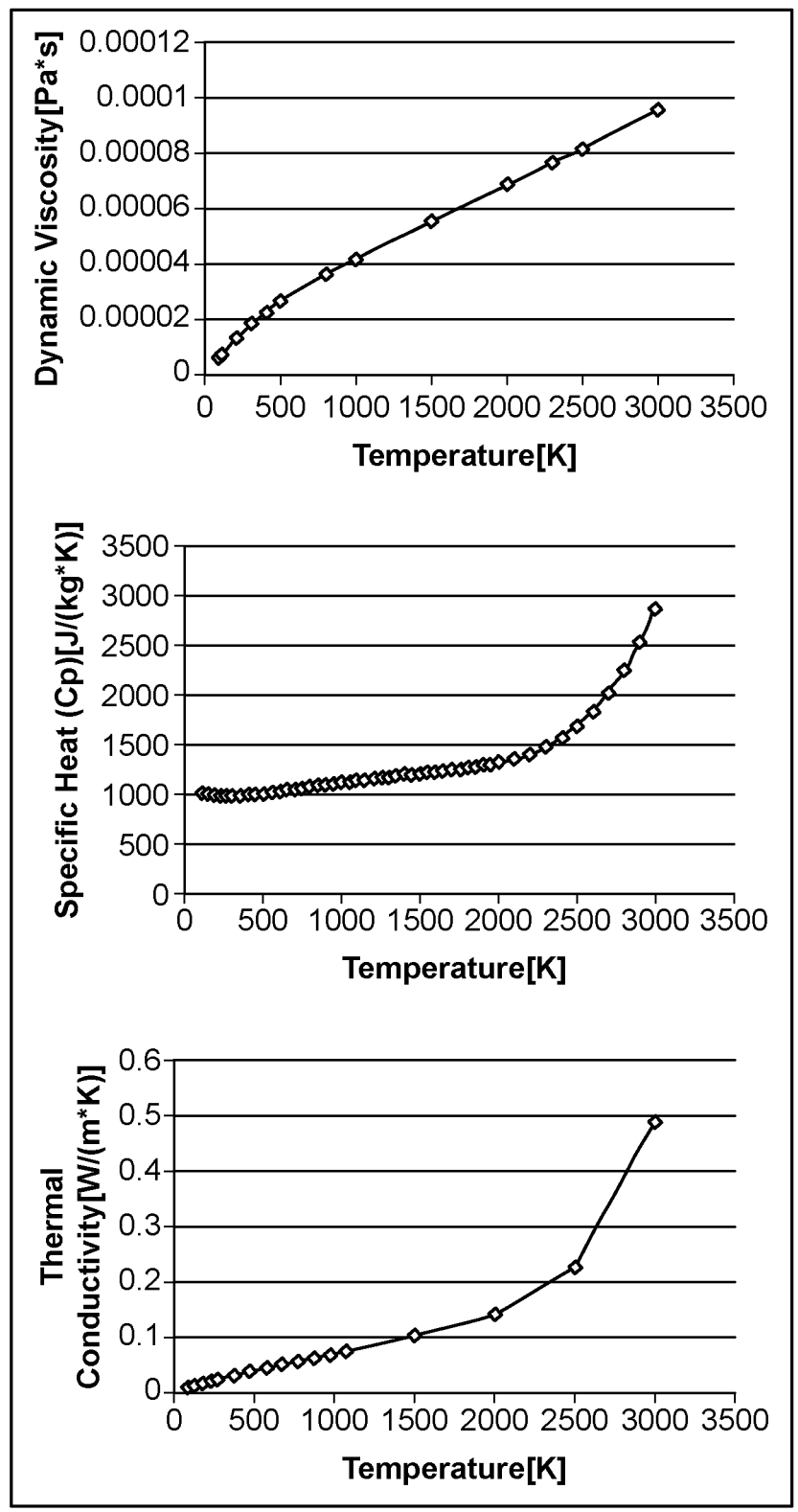
FIG. 8 are details line graphs showing fluid flow and viscosity of the interior of the main housing while in use in accordance with one embodiment of the present invention.

FIG. 8 shows the dynamic viscosity test results for the air flow through the main housing 102 and the air flow port when in use. The data shows an improved fluid flow and thus improved chum efficiency together with ease of use.

Figure 9:
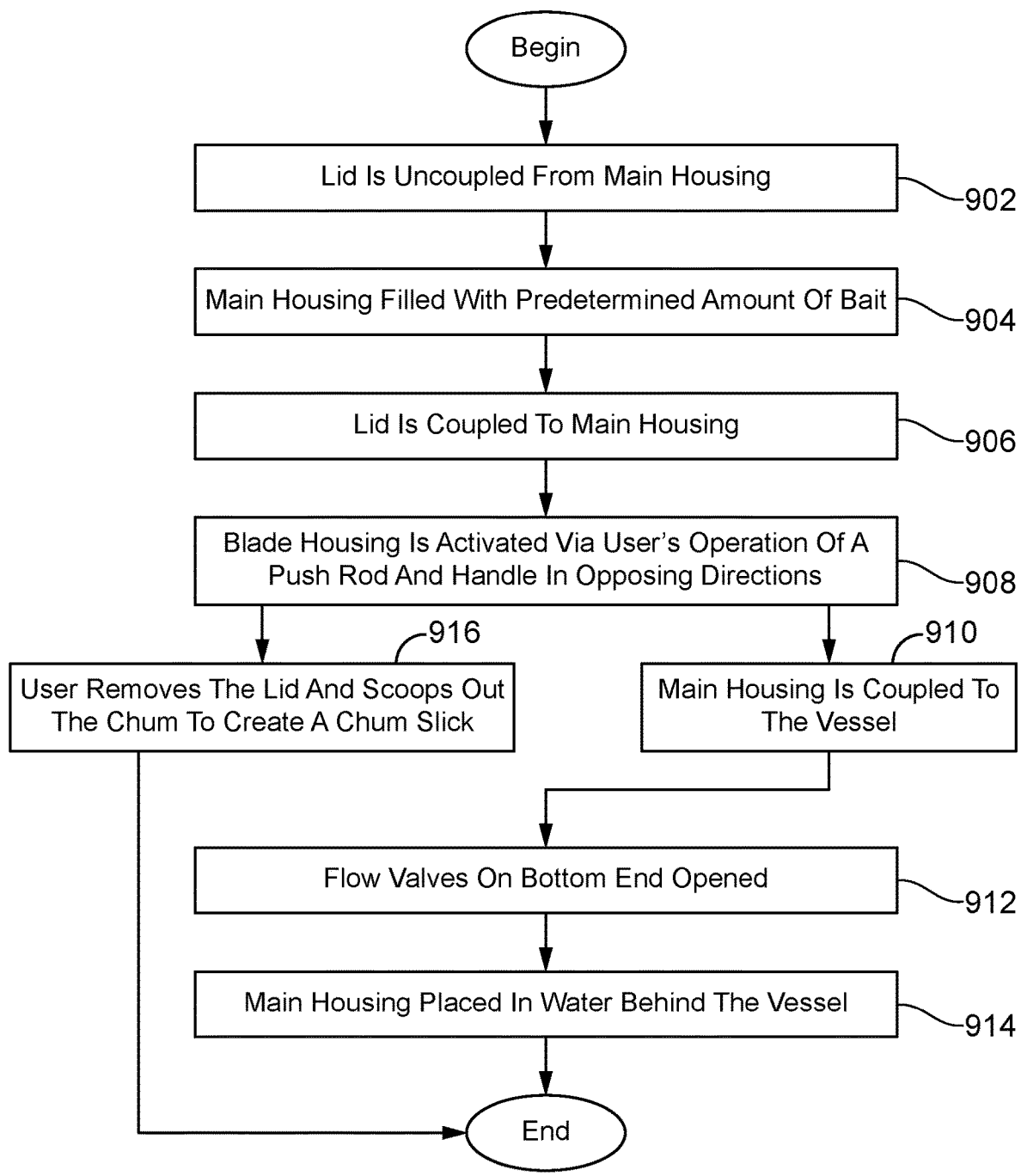
FIG. 9 is a method diagram showing the steps to use the device in accordance with one embodiment of the present invention.

FIG. 9 is a step-wise flow cart depicting a method for macerating bait. At step 902, a main housing having a top openable end and a bottom openable end is provided, and the lid is uncoupled from the housing. The housing comprises a removable lid attachable to the top open end, such that the removable lid comprises at least a fluid flow hole configured to, when placed in a fluid and towed behind the vessel, port the fluid to flow through the housing through upper end and through the lower end At step 904, the main housing if filled with predetermined amount of bait.

At step 906, the lid is coupled to the housing.

At step 908, a concentric cutting member is pushed via a push rod and handle in opposing directions. The concentric cutting member comprises a series of blades that are intersecting to macerate bait.

At step 910 the housing is connected to a vessel, or at step 916, the user removes the lid and scoops out the chum to throw it overboard to create a chum slick, at which point the process ends. However, if the housing is connected to a vessel, the process continues as follows:

At step 912, the bottom end is open, either via removing the bottom cap, opening valves in the bottom, or providing fluid flow ports in the bottom (similar to the top);

At step 914, the housing is placed the housing into a fluid and towed the housing behind the vessel such that the fluid flows through the bottom open end to the top open end through a fluid flow hole and thereby releasing an optimized chum slick out of the fluid flow hole.

While the present invention has been described about what are presently considered to be the most practical and preferred embodiments, it is to be understood that the present invention is not limited to these herein disclosed embodiments. Rather, the present invention is intended to cover all the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all the features in any of the other drawings. The words "including," "comprising," "having," and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

I claim:

1. A device for macerating bait, making chum, or both, the device comprising:
    a housing having a top openable end and a bottom end that is openable;
    a removable lid attachable to the top openable end, wherein the removable lid comprises at least a fluid flow hole;
    a push rod disposed through the removable lid;
    a concentric cutting member attached to the push rod at a lower end of the push rod, wherein the concentric cutting member comprises a series of blades that intersect each other and have cutting edges on a top and bottom of the blades;
    a series of support slats positioned at the bottom end of the housing, wherein the series of support slats comprises an outer wheel, a plurality of spokes, and a center aperture;
    a bottom connector attached to one of the series of support slats, wherein the bottom connector attaches to a vessel for towing;
    three air flow holes positioned wherein the three air flow holes are positioned one hundred and twenty degrees spaced equally apart, wherein each of the three air flow holes are covered in a mesh, wherein the mesh is configured to prevent large chunks of the bait from escaping through the three air flow holes;
    closeable and openable flaps located proximate each of the three air flow holes, wherein the closable and openable flaps are configured to close to cover and uncover the each of the three air holes;
    at least two fluid flow ports on the bottom end of the housing, wherein the two fluid flow ports are coupled to bottom end closeable and openable flaps that are configured, when towed behind a vessel and in the open position, allow a fluid to enter the housing and create a pressure necessary to cause the chum slick to exit the housing through the fluid holes located on the lid, wherein the mesh is configured to keep the large chunks of bait in the housing when towed by the vessel;
    a handle attached to the push rod, the handle being configured to allow a user to slide the push rod in a reciprocating motion, and also in a rotating motion to macerate bait;

a center hole in the lid through which the push rod is disposed;

a grommet positioned around the center hole and the push rod, the grommet configured to provide a seal between the lid and push rod, and protect the push rod from dimensioned to allow the push rod to perform a twist or rotational motion;

a ferrule disposed in the center hole configured as a guideway and to support the push rod;

a spring engaged at an end of the push rod configured to permit free reciprocating movement of the push rod.

2. The device of claim 1, wherein the series of blades that intersect each other intersect at ninety-degree angles, wherein the cutting edges on both the top and bottom of the blades function to, when actuated by the push rod, macerate bait when a user pushes and pulls the push rod.

3. The device of claim 1, further comprising:

a lock nut for coupling a handle and the push rod at a top of the push rod;

a lock washer configured to couple the concentric cutting members to the push rod at a bottom of the push rod.

4. The device of claim 1, wherein the lid is held to the housing using a gasket seal.

5. The device of claim 1, further comprising:

a handle connected to housing.

6. A method for macerating bait, making chum, forming a chum slick in a fluid, or any combination thereof, the method comprising:

providing a housing have a top openable end and a closed bottom end that is openable, a removable lid attachable to the top open end, wherein the removable lid comprises at least a fluid flow hole; a push rod disposed through the removable lid; a concentric cutting member attached to the push rod at a lower end of the push rod, wherein the concentric cutting member comprises a series of blades that intersect each other and have cutting edges on a top and bottom of the blades; a series of support slats positioned at the bottom end of the housing, wherein the series of support slats comprises an outer wheel, a plurality of spokes, and a center aperture; a bottom connector attached to one of the series of support slats, wherein the bottom connector attaches to a vessel for towing three air flow holes positioned wherein the three air flow holes are positioned one hundred and twenty degrees spaced equally apart, wherein each of the three air flow holes are covered in a mesh, wherein the mesh is configured to prevent large chunks of the bait from escaping through the three air flow holes; closeable and openable flaps located proximate each of the three air flow holes, wherein the closable and openable flaps are configured to close to cover and uncover the each of the three air holes; at least two fluid flow ports on the bottom end of the housing, wherein the two fluid flow ports are coupled to bottom end closeable and openable flaps that are configured, when towed behind a vessel and in the open position, allow a fluid to enter the housing and create a pressure necessary to cause the chum slick to exit the housing through the fluid holes located on the lid, wherein the mesh is configured to keep the large chunks of bait in the housing when towed by the vessel, a handle attached to the push rod, the handle being configured to allow a user to slide the push rod in a reciprocating motion, and also in a rotating motion to macerate bait, a center hole in the lid through which the push rod is disposed, a grommet positioned around the center hole and the push rod, the grommet configured to provide a seal between the lid and push rod, and protect the push rod from dimensioned to allow the push rod to perform a twist or rotational motion;

a ferrule disposed in the center hole configured as a guideway and to support the push rod a spring engaged at an end of the push rod configured to permit free reciprocating movement of the push rod, filling the housing with a predetermined amount of bait;

opening the flaps on each of the three airholes;

closing the flaps on each of the at least two fluid flow ports;

pushing and pulling the concentric cutting member via the push rod and handle in opposing directions, wherein the concentric cutting member comprises the series of blades that intersect each other;

attaching the housing to vessel;

opening the flaps on each of the at least two fluid flow ports;

placing the housing in the fluid and towing it behind the vessel such that when towed, the fluid flows through the top end through the housing and out the three air flow holes thereby forming the chum slick out of the at least a fluid hole.

7. The method of claim 6, wherein the blades that intersect each other intersect at ninety-degree angles and have cutting portions on both a top and a bottom of the blades, wherein when actuated by a push rod, the blades are configured to macerate bait when a user pushes and pulls the push rod.

* * * * *